United States Patent [19]

Cano

[11] Patent Number: 4,878,311
[45] Date of Patent: Nov. 7, 1989

[54] BUOYANT FISHING CONTAINER

[76] Inventor: David L. Cano, 10615 Meadowglen No. 1007, Houston, Tex. 77042

[21] Appl. No.: 237,801

[22] Filed: Aug. 29, 1988

[51] Int. Cl.$^4$ .............................................. A01K 97/10
[52] U.S. Cl. ......................................... 43/54.1; 43/55
[58] Field of Search .................................. 43/54.1, 55

[56] References Cited

U.S. PATENT DOCUMENTS

| | | | |
|---|---|---|---|
| 3,025,629 | 3/1962 | Sears | 43/55 |
| 3,478,463 | 11/1969 | Ruter | 43/55 |
| 3,603,019 | 9/1971 | Smeltzer | 43/55 |
| 3,717,124 | 2/1973 | Jacobs | 43/55 |

Primary Examiner—Nicholas P. Godici
Assistant Examiner—Michael William Starkweather
Attorney, Agent, or Firm—Diller, Ramik & Wight

[57] ABSTRACT

A buoyant container or basket which permits wading fishermen to spend extended time in the water with all of their gear ready at hand in a manner which also prevents interference with the wading fisherman's freedom of movement. The buoyant container or basket is constructed as a hollow tubular frame defining a continuous loop filled with buoyant material. A porous container body or basket in which fishing gear can be housed depends from the frame. Hooks on the frame hold a flexible net cover or bungee cords over the articles contained in the basket to prevent loss, and rod holders are provided for extra rods.

12 Claims, 1 Drawing Sheet

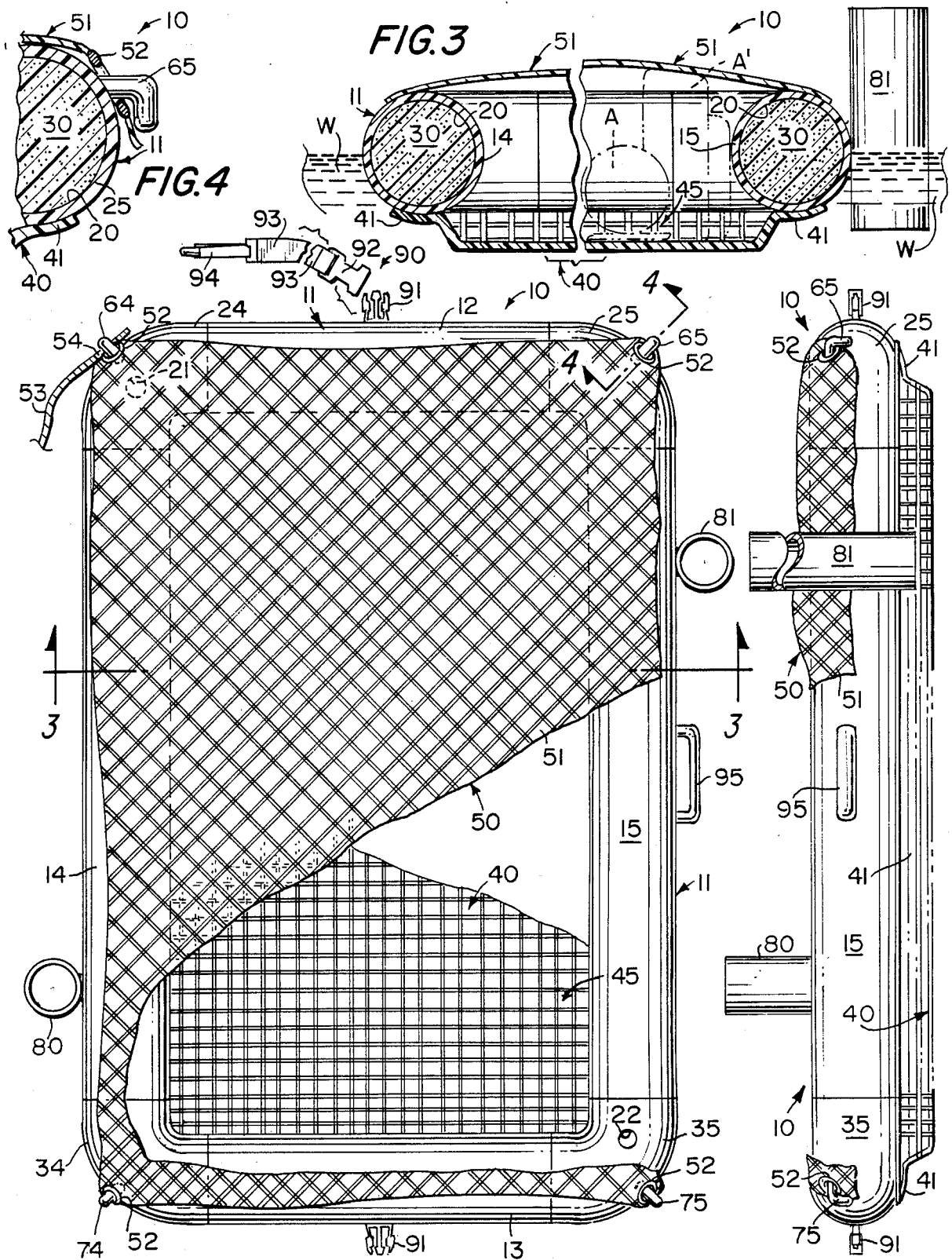

BUOYANT FISHING CONTAINER

BACKGROUND OF THE INVENTION

This invention is directed to the prior art of fishing in general, and specifically to the provision of a buoyant container or basket which is adapted to float upon water and contain articles therein which are particularly adapted for use by fishermen wading in streams, rivers, lakes, oceans or the like.

Typically, lake, pond and "surf" fishermen can be observed fishing "from shore," so to speak, and these fishermen generally walk to different positions as conditions dictate. Fishermen not only carry their fishing rods, but also carry bait and/or artificial lures, perhaps an extra fishing rod, hooks, extra line, sinkers, extra reels, food to eat and liquid to drink, etc. Some or all of this can be packed into a fishing box or fishing vest and little difficulty is presented during movement of a fisherman along a river or lake bank or while walking the shore. A very popular approach to fishing, be it bait casting, spin casting or fly fishing is so-called "wading" or "wet wading." As the names imply, a "wading" fisherman simply walks into the water at one point from the shore, fishes a length of water, particularly a river from pool-to-pool or riffle-to-riffle, etc., and eventually returns to shore. Obviously, it is impractical for a wading fisherman to leave his fishing supplies on shore, walk out into the river, fish, and return to shore each time he wishes to move on to a new fishing area. Having long since recognized this impractical approach, wading fishermen generally "go light" and carry everything possible in the way of bait, extra lines, leaders, drinks and sandwiches, etc. in fishing vests which they wear, "fanny packs" or backpacks, etc. However, when wading for a considerable length of time, particularly during hot weather, the wearing of vests, backpacks, etc. is not only cumbersome, it is uncomfortable. It is also very difficult for a wading fisherman to carry an extra fishing rod, assembled or not, or to rest as he might typically do on shore by leaning his rod against a tree and relaxing his arms momentarily. When in the middle of a river in waist-high water, there is simply nowhere to "rest" a fishing rod safely unless one were near protruding boulders, logs or like flotsam. Carrying an extra rod by a wading fisherman is generally accomplished by inserting the butt end or handle into the fisherman's back pocket or between the small of his back and his belt with the tip pointing upwardly and tethered by a cord encompassing his upper body. This is particularly inconvenient for fly fishermen since the upwardly projecting tip of the extra rod is a hazard as the fly-line is moving between forward and backward loops. Accordingly, a wading fisherman would prefer to have in hand and accessible all necessary fishing supplies while he is in mid-river or the like, yet be assured that these do not encumber or interfere with his fishing.

SUMMARY OF THE INVENTION

In keeping with the foregoing, the present invention is directed to a novel system which permits wading fishermen to spend extended time in the water with all of their gear ready at hand, yet in such a manner to prevent interference with a wading fisherman's freedom of movement to investigate and fish the most desirable areas of a stream, river, or the like.

In keeping with the foregoing, a novel buoyant container is provided which will float upon water and contain articles therein which are particularly adapted for use by wading fishermen, as for example, extra reels, line, bait, food, drinks, an extra fishing rod, etc. Preferably, the buoyant container is constructed as a hollow tubular frame of plastic material defining a continuous loop, and the frame is filled with buoyant material, such as polymeric or copolymeric plastic material (urethane foam). Urethane foam can be inserted into the tubular frame as the frame is being fabricated or alternatively, the urethane can be formed in situ after the frame has been completely formed. A porous container body, such as a basket of flexible or rigid net-like material (preferably nylon) is glued, taped or otherwise adhered to the frame and depends therefrom. It is within this basket that sundry articles can be inserted, and appropriate means, such as a resilient net cover, is provided to close over the top of the frame and the articles therein. Conventional bungee cords can also be used in lieu of or in addition to the flexible net cover. Appropriate hooks are secured to the frame for securing the bungee cords and/or flexible net cover to the frame. When the buoyant container, as thus far described, is placed upon the water, the buoyancy afforded the same by the buoyant urethane foam assures that the container will remain buoyant even though the basket and the articles contained therein are partially or totally immersed in water. However, the articles which are carried in the basket are either contained in water-proof containers (such as cans of soda or beer), or in water proof (zip-lock) bags, or are unaffected by water in the net basket, such as extra spools of line, leader, fishing reels and the like. Alternatively, the porous net basket could be constructed from imperforate material, and though this would lend added buoyancy to the overall container, the center of buoyancy would be higher than that of a comparably sized porous basket, and thus the porous net basket is preferable.

The buoyant container is also provided with quick connect/disconnect coupling means for securing a line or tether between the frame and the waistband or belt of a fisherman. If, for example, the tether or line is 3'-6' in length, the wading fisherman can freely maneuver in a river and the downstream direction of the current would maintain the buoyant container 3'-6' downstream from the fisherman and obviously at a point which no way interferes with the fisherman while wading or fishing. However, when something is needed which is in the buoyant container, the fisherman need but pull on the tether/line, draw the buoyant container near, select the particular article desired, and allow the buoyant container to float away from his body to a position of noninterference.

One or more plastic tubes are also secured to the frame to carry extra rods. For example, the fisherman may be fly fishing with one rod while an "extra" spinning rod is supported in the rod-holding tube of the buoyant container. While fly fishing the fisherman might see a fish "riset" or "break water" at a point which is too far to reach by fly-casting or the water is too deep to wade closer and yet reach by fly-casting, and the fisherman need but insert his fly rod butt in one of the rod holders without even reeling in his fly-line which will simply float downstream, withdraw his spinning rod, cast the necessary extra distance to the area of the strike or rise, and hopefully catch the fish. Thereafter, the spinning rod can be placed back in the tubular rod holder, the fly rod removed from its holder, and fly fishing can then continue.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a top plan view of the buoyant container of this invention with a portion thereof broken away for clarity and illustrates a tubular frame, a centrally located basket, a flexible net cover, and a plurality of hooks and rod holders and a quick connect/disconnect coupling carried by the frame.

FIG. 2 is a side elevational view of the buoyant container of FIG. 1 and more clearly illustrates the basket protruding beneath the frame, the rod holders, several of the hooks, and the quick connect/disconnect couplings and an associated tether.

FIG. 3 is an enlarged cross sectional view taken generally along line 3—3 of FIG. 1 and illustrates the buoyant container immersed in water with articles housed therein and prevented from being accidentally or inadvertently discharged by the flexible net cover.

FIG. 4 is an enlarged view taken generally along line 4—4 of FIG. 1 and illustrates details of the flexible net and a grommet thereof secured to one of the hooks of the frame.

DESCRIPTION OF THE PREFERRED EMBODIMENT

A novel buoyant container constructed in accordance with this invention is best illustrated in FIGS. 1-3 of the drawings and is generally designated by the reference numeral 10.

The buoyant container 10 is adapted to float upon water and contain articles therein particularly adapted for use by wading fishermen as earlier described herein.

The buoyant container 10 is defined by a frame 11 in the form of a continuous loop of a generally annular configuration, as is best seen in FIG. 1. The frame 11 is preferably constructed from four hollow tubular pieces of relatively rigid and strong polymeric/copolymeric plastic material, such as ABS plastic, and four "elbows" of the same material. The straight hollow tubular pieces or tubes are identified by the reference numerals 12–15 and the four elbows are identified by the reference numerals 24, 25, 34 and 35. The latter numerals have been selected as a matter of convenience to quickly identify the particular radius or elbow in relation to the straight tubes to which it is connected by defining the elbow from the last integer of the two connecting tubes. For example, the elbow 24 is connected between the tubes 12, 24; the elbow 25 being connected to the straight tubes 12, 15, etc.

Means, generally designated by the reference numeral 30 (FIG. 3), is provided for imparting buoyancy to the frame 11. The means 30 is buoyant material, such as buoyant polymeric/copolymeric plastic material, particularly urethane foam housed within an overall hollow or chamber 20 (FIG. 3) of the overall frame 11. The buoyant material 30 can be inserted individually into each of the tubes 12–15 and the elbows 24, 25, 34 and 35 prior to assembling the latter and gluing the same to each other. Preferably, however, the elbows 24, 35 are provided with respective apertures or holes 21, 22 which open into the hollow 20. The frame 11 is made by gluing the tubes 12–15 and the elbows 24, 25, 34 and 35 together but without the buoyant material 30 being first inserted therein. Instead, while the hollow 20 remains empty a nozzle is inserted in, for example the opening 21 and urethane foam is foamed in situ through the opening 21 into the hollow 20 travelling along both straight tubes 12, 14 toward, into and out of the opening 22 at which time the flow of the urethane foam into the opening 21 is stopped. The urethane foam sets, solidifies and rigidifies, and any excess protruding from the openings 21, 22 can be cut and discarded. In this fashion the totality of the hollow 20 is filled with the buoyant material/urethane foam 30.

A porous container body which is generally designated by the reference numeral 40 (FIG. 3) is preferably constructed from relatively rigid nylon netting and is preformed to the relatively shallow configuration shown in FIG. 3. A peripheral edge portion 41 of the porous container body or basket 40 is bonded by a high grade marine adhesive or a nylon strap to the underside of the frame 11 and in conjunction with the frame 11 defines a container or basket interior 45 into which sundry articles A, A', etc. can be located, stored and housed. The articles A, A', etc. can be, for example, extra spools, line, leader, soda, beer, sandwiches, hooks or the like. Some of the latter articles are housed in water-proof containers, such as the soda or beer, and are obviously unaffected when the buoyant container 10, and particularly the basket 40 is immersed in water W and floats thereupon as shown in FIG. 3. Others of the articles A, A', etc. such as extra reels, spools of line and/or leader are unaffected by the water and anything which might be affected by the water, such as sandwiches, can be packaged in water-proof bags/containers. However, because the water W enters and fills the interior 45 of the net basket 40, the center of buoyancy of the overall buoyant container 10 is relatively low and much lower than that which would otherwise be afforded if the basket 40 were imperforate/nonporous. Thus, the tendency of the buoyant container 10 to tip or upset is reduced immeasurably by the low center of buoyancy thereof created by the water W introduced into the interior 45 of the basket 40 through the net webbing thereof.

Means generally designated by the reference numeral 50 is provided for preventing the articles A, A', etc. from accidentally or inadvertently being discharged from the interior 45 of the buoyant container 10 and particulay the net basket 40 thereof. The means 50 is alternatively or collectively a resilient or elastic net or web cover 51 having a grommet 52 (FIG. 4) at each of four corners thereof, or one or more elastic or resilient bungees or bungee cords 53 (FIG. 1) each having opposite ends terminating in loops 54. Four downwardly depending plastic hooks 64, 65, 74 and 75 are adhesively bonded to or integrally molded with the elbows 24, 25, 34 and 35, respectively. The resilient/elastic net cover 51 is best shown in FIGS. 1 and 2 overlying the entire upper face of the frame 11 and totally spanning the interior 45 of the net basket 40 thereby covering all of the articles A, A', etc. therein, and each grommet 52 at the four corners of the net cover 51 is connected to one of the associated hooks 64, 65, 74, 75 in the manner illustrated in FIG. 4 relative to the grommet 52 fastened to the hook 65. Thus, should the entire buoyant container overturn, all of the articles A, A', etc. would be supported by the elastic net cover 51 which would be lowermost and since the hooks 64, 65, 74 and 75 would in the latter inverted position be directed upwardly, the net cover 51 could not be pulled off these hooks by the weight of the articles A, A', etc. Obviously, the buoyant container 10 need then simply be uprighted and placed in its normal position for continued use by a wading fisherman.

Obviously, one or more of the bungee cords 53 can in lieu of or in addition to the resilient net cover 51 be secured in spanning relationship across the frame 11. For example, though there is illustrated but a single bungee cord 53, two such bungee cords could be connected in cross fashion, one of the bungee cords being connected by its loops 54 to the hooks 64, 75 and the other of the bungee cords being connected by its loops 54 to the hooks 65, 74. Obviously, two such bungee cords by themselves in X-shape crossing fashion could hold larger articles within the basket 40 in lieu of the resilient net cover 51. However, if the articles A, A', etc. are relatively heavy, it might be desirable to not only apply the net cover 51 in spanning covering relationship to the articles A, A', etc., but to also overlay the bungee cords 53 across the top of the cover 51 in the X-shape configuration earlier described to further assure that should the buoyant container 10 tip upside down, even the most heavy articles A, A', etc. would not cause the net 50 to dislodge from any of the hooks 64, 65, 74 and 75 or the articles otherwise fall from the interior 45.

The bungees 53 can also be used for purposes other than for supporting the articles A, A', etc. within the basket 40. For example, many fishermen choose not to carry an extra rod in the set-up condition into a river or lake while wading, and would rather carry the rod in its associated carrying case which is generally constructed from aluminum or rigid plastic material. The rod is in this fashion protected and might not be inadvertently broken. In order to carry a rod case in this fashion, it need but be positioned parallel to any of the tubes 12–15 and secured by the bungee cords 53 across the appropriate hooks 64, 65, 74 and 75. For example, if the rod case is essentially laid upon and parallel to the tube 14, one of the bungee cords 53 would be connected between the loops 64, 65 and the other of the bungee cords 53 would be connected between the hooks 74, 75 with, of course, both bungee cords going over the top of the rod case and generally normal thereto. In this fashion the rod case would be secured to the frame 11, even if the buoyant container were inverted. Preferably, the rod case is so connected to the frame prior to the net cover 51 being secured thereto which would allow the grommets 52 of the net cover 51 to be removed from or applied to any of the hooks 64, 65, 74 and 75 without removing the first applied loops 54 of the bungees 53.

Two tubular plastic tubes or rod holders 80, 81 are also adhesively secured to selected portions of the frame 11, and the internal diameter thereof is sufficient to accommodate the butt end or handle of a fishing rod. In this case the fishing rod is set-up and is supported in either of the rod holders 80, 81 in a conventional manner and used as described heretofore.

It is also necessary for the buoyant container 10 to be safely and conveniently tethered to the wading fisherman, and such is accomplished by convenient and conventional quick connect/disconnect coupling means, clasp or buckle 90 defined by a male coupling 91 and a female coupling 92, the details of which are not disclosed herein but correspond to those disclosed in U.S. Pat. No. 4,150,464 in the name of Richard J. Tracy and U.S. Pat. No. 4,662,040 in the name of Kym A. Terrell et al., the details of which are incorporated herein by reference. A male coupling 91 is adhesively secured to each of the tubes 12, 13, and in this fashion the female coupling 92 can be selectively coupled or uncoupled to either. The female coupling 92 carries a rope, line or tether 93 of a desired suitable length (3'-6') to an end of which is connected a snap safety-hook 94 which can be secured to the belt of the wading fisherman. Therefore, when the fisherman is in the water W the buoyant container 10 will be positioned a suitable non-interfering distance away, but readily accessible by simply pulling upon the tether 93 to draw the buoyant container 10 through the water toward the fisherman to gain access to the container interior 45 and the articles A, A', etc.

If desired, a handle 95 can be bonded to or formed as part of the frame 11 for carrying purposes, even with the articles A, A', etc. therein. With the articles A, A', etc. in the net basket 40 and with the net cover 51 secured to the hooks 64, 65, 74 and 75 and/or with the bungee cords 53 across the net cover 51 in the X-shape fashion hertofore described, the handle 95 need be but grasped and lifted and the entire container buoyant container 10 and its contents can be carried without fear of the contents being dislodged or dropped therefrom, including the carrying case secured thereto by the bungees, be they crossed or in the parallel relationship earlier described.

In lieu of the urethane 30 filling the frame 11, the same may simply be hollow and thus will float because the frame is completely air-tight. Thus, the air in the chamber 20 will provide sufficient buoyancy to float the buoyant container 10 without the urethane filling 30.

Although a preferred embodiment of the invention has been specifically illustrated and described herein, it is to be understood that minor variations may be made in the apparatus without departing from the spirit and scope of the invention, as defined in the appended claims.

I claim:

1. A buoyant container adapted to float upon water and contain articles therein particularly adapted for use by a wading fisherman comprising: a generally continuous closed loop polygonal frame, means in the form of buoyant material housed within said frame for imparting buoyancy thereto, a relatively shallow basket depending from said frame adapted to contain therein sundry articles whereby said basket can be immersed in water yet remains afloat and upright due to the relatively low center of buoyancy created by said relatively shallow basket, a net of flexible material in spanning relationship to an uppermost portion of said frame for preventing articles from being accidentally or inadvertently being discharged from said basket, means for releasably securing peripherally spaced portions of said net to peripherally spaced portions of said frame and maintaining said net in spanning relationship to said frame, said frame normally being disposed in a generally horizontal plane in the in-use floating position thereof, and handle means carried by said frame for supporting said frame in another in-use carrying position in which said frame is disposed in a generally vertical plane in which said net also functions to prevent articles from being discharged accidentally or inadvertently from said basket.

2. The buoyant container as defined in claim 1 wherein said handle means is defined as an integral portion of said frame.

3. The buoyant container as defined in claim 1 wherein said handle means is defined as an integral portion of said frame, and projects generally laterally from said frame.

4. The buoyant container as defined in claim 1 wherein said securing means includes hook means disposed generally contiguous corners of said frame.

5. The buoyant container as defined in claim 1 wherein said frame includes a pair of rod holders disposed one at each of a pair of generally spaced parallel frame portions.

6. The buoyant container as defined in claim 1 wherein said net is constructed from elastic material.

7. The buoyant container as defined in claim 2 wherein said securing means includes hook means disposed generally contiguous corners of said frame.

8. The buoyant container as defined in claim 7 wherein said net is constructed from elastic material.

9. A buoyant container adapted to float upon water and contain articles therein particularly adapted for use by a wading fisherman comprising: a generally continuous closed loop polygonal frame, means in the form of buoyant material housed within said frame for imparting buoyancy thereto, a relatively shallow basket depending from said frame adapted to contain therein sundry articles whereby said basket can be immersed in water yet remains afloat and upright due to the relatively low center of buoyancy created by said relatively shallow basket, a net of flexible material in spanning relationship to an uppermost portion of said frame for preventing articles from being discharged accidentally or inadvertently from said basket, means for releasably securing peripherally spaced portions of said net to peripherally spaced portions of said frame and maintaining said net in spanning relationship to said frame, said frame normally being disposed in a generally horizontal place in the in-use floating position thereof, said frame being defined by first and second pairs of generally parallel spaced end and side frame portions, each adjacent end and side frame portion defining a corner portion therebetween, said securing means being located generally at each of said corner portions, at least one tubular rod holder along one of said end and side frame portions, and means along another of said end and side frame portions for removably attaching said frame to a tether thereby securing the buoyant frame to a fisherman while wading.

10. The buoyant container as defined in claim 9 wherein said net is constructed from elastic material.

11. The buoyant container as defined in claim 9 including handle means carried by said frame for supporting said frame in another in-use carrying position in which said frame is disposed in a generally vertical plane in which said net also functions to prevent articles from being discharged accidentally or inadvertently from said basket.

12. The buoyant container as defined in claim 10 including handle means carried by said frame for supporting said frame in another in-use carrying position in which said frame is disposed in a generally vertical plane in which said net also functions to prevent articles from being discharged accidentally or inadvertently from said basket.

* * * * *